(12) United States Patent
Narisetty et al.

(10) Patent No.: US 12,094,330 B2
(45) Date of Patent: Sep. 17, 2024

(54) TRAFFIC PREDICTION APPARATUS, SYSTEM, METHOD, AND NON-TRANSITORY COMPUTER READABLE MEDIUM

(71) Applicant: NEC Corporation, Tokyo (JP)

(72) Inventors: Chaitanya Prasad Narisetty, Tokyo (JP); Akihiro Tanaka, Tokyo (JP); Tomoyuki Hino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 351 days.

(21) Appl. No.: 17/622,958

(22) PCT Filed: Jul. 1, 2019

(86) PCT No.: PCT/JP2019/026131
§ 371 (c)(1),
(2) Date: Dec. 27, 2021

(87) PCT Pub. No.: WO2021/001889
PCT Pub. Date: Jan. 7, 2021

(65) Prior Publication Data
US 2022/0262240 A1 Aug. 18, 2022

(51) Int. Cl.
*G08G 1/01* (2006.01)
*G06N 20/00* (2019.01)
(Continued)

(52) U.S. Cl.
CPC ........... *G08G 1/0133* (2013.01); *G06N 20/00* (2019.01); *G08G 1/0116* (2013.01); *G08G 1/04* (2013.01); *G08G 1/042* (2013.01); *G08G 1/052* (2013.01)

(58) Field of Classification Search
CPC .. G08G 1/00; G08G 1/01; G08G 1/04; G08G 1/052; G06N 20/00; E06F 11/00; H01L 41/08; H01L 41/107
See application file for complete search history.

(56) References Cited

U.S. PATENT DOCUMENTS

| | | | |
|---|---|---|---|
| 2016/0275788 A1* | 9/2016 | Wu | G08G 1/02 |
| 2018/0342156 A1* | 11/2018 | Martin | G08G 1/052 |
| 2023/0177819 A1* | 6/2023 | Iandola | G06F 30/20 |
| | | | 701/27 |

FOREIGN PATENT DOCUMENTS

| | | |
|---|---|---|
| CN | 102359043 A | 2/2012 |
| JP | H04-225166 A | 8/1992 |

(Continued)

OTHER PUBLICATIONS

JP Office Action for JP Application No. 2021-577432, mailed on Mar. 7, 2023 with English Translation.

(Continued)

*Primary Examiner* — Tan Q Nguyen

(57) ABSTRACT

The present disclosure provides a traffic prediction apparatus, system, method and program capable of predicting the number of vehicles and the speed of vehicles in a predetermined time and in a predetermined range based on waterfall data of vehicles. The traffic prediction apparatus comprises acquisition means for acquiring waterfall data comprising a generation position of a vibration, a generation time of the vibration and an amplitude of the vibration generated by a vehicle traveling on a road, pre-processing means for transforming the acquired waterfall data, generation means for training a portion of the plurality of processed waterfall data and at least one corresponding ground truth traffic property used as plurality of labels to generate a trained model, wherein the ground truth may be obtained from a secondary acquisition means, and prediction means for predicting at least one traffic property for a processed waterfall data.

13 Claims, 11 Drawing Sheets

(51) Int. Cl.
　　　*G08G 1/04*　　　(2006.01)
　　　*G08G 1/042*　　(2006.01)
　　　*G08G 1/052*　　(2006.01)

(56) References Cited

FOREIGN PATENT DOCUMENTS

| | | |
|---|---|---|
| JP | 2009-514081 A | 4/2009 |
| WO | 2017/072505 A1 | 5/2017 |

OTHER PUBLICATIONS

International Search Report for PCT Application No. PCT/JP2019/026131, mailed on Oct. 1, 2019.
Ito Hayao et al., "Construction of traffic volume estimation models based on the multiple regression analysis of waveform features extracted from bridge dynamic monitoring data", Journal of structural engineering, vol. 63A, Mar. 2017, pp. 239-250.
Stocker Markus et al., "Situational Knowledge Representation for Traffic Observed by a Pavement Vibration Sensor Network", IEEE Transactions on Intelligent Transportation Systems, vol. 15, No. 4. Aug. 2014, pp. 1441-1450.
Miao Shengfa et al., "Analysis of Traffic Effects on a Dutch Highway Bridge", Assessment, Upgrading and Refurbishment of Infrastructures, IABSE, May 2013, pp. 357-364.
Ueno Hideki et al., "Estimation of Traffic Condition using Image Processing based Probe System", IPSJ SIG Technical Report, vol. 2017-ITS-70 No. 11. Aug. 5, 2017, pp. 1-5.
Kleyko Denis et al., "Comparison of Machine Learning Techniques for Vehicle Classification using Road Side Sensors", 2015 IEEE 18th International Conference on Intelligent transportation Systems, Sep. 2015, pp. 572-577.

\* cited by examiner

TRAFFIC PREDICTION APPARATUS, SYSTEM, METHOD, AND NON-TRANSITORY COMPUTER READABLE MEDIUM

TECHNICAL FIELD

The present disclosure relates to a traffic prediction apparatus, system, method, and program. In particular, the present disclosure relates to a traffic prediction apparatus, system, method and program capable of predicting the number of vehicles and the speed of vehicles in a predetermined time and in a predetermined range based on waterfall data of vehicles.

BACKGROUND ART

A distributed vibration sensor that detects a vibration generated by a vehicle (moving object) running on a road by way of an optical fiber provided along the road is well known.

PL 1 discloses "The measurement signals (waterfall data) from the sensing portions are processed to detect vehicles travelling on the road and to determine at least one traffic flow property.". PL 1 also discloses "using a traffic flow model to relate the detected flow property (estimated above) to a modelled flow property (actual).".

CITATION LIST

Patent Literature

PL 1: International Publication No. 2017/072505.

SUMMARY OF INVENTION

Solution to Problem

PL 1 discloses "the processor (105) may employ a tracking algorithm to identify vehicle tracks as a detected vehicle". However, PL 1 does not disclosed how the measured signal is processed. When the volume of traffic is less i.e. when vehicles are not densely present, one can use basic principles of signal processing to identify and process vehicle tracks of individual vehicles. However, for higher volumes of traffic i.e. when vehicles are densely present, their corresponding vehicle tracks may overlap and get mixed among themselves. Therefore, it is difficult to separate individual vehicle tracks from a given waterfall data.

An object of the present disclosure is to provide a traffic prediction apparatus, system, method and program that solve any of the problems described above.

A traffic prediction apparatus according to the present disclosure comprising:
  acquisition means for acquiring waterfall data comprising a generation position of a vibration, a generation time of the vibration and an amplitude of the vibration generated by a vehicle traveling on a road;
  pre-processing means for transforming the acquired waterfall data;
  generation means for training a portion of the plurality of processed waterfall data and at least one corresponding ground truth traffic property used as plurality of labels to generate a trained model, wherein the ground truth may be obtained from a secondary acquisition means; and
  prediction means for predicting at least one traffic property for a processed waterfall data within a predetermined time range and within a predetermined position range based on the trained model.

A system according to the present disclosure comprising:
  a distributed vibration sensor and a traffic prediction apparatus; wherein
  the distributed vibration sensor includes;
  an optical fiber provided along a road, and
  a plurality of sensing portions on the optical fiber for detecting vibrations,
  the traffic prediction apparatus includes;
  acquisition means for acquiring waterfall data comprising a generation position of a vibration, a generation time of the vibration and an amplitude of the vibration generated by a vehicle traveling on a road;
  pre-processing means for transforming the acquired waterfall data;
  generation means for training a portion of the plurality of processed waterfall data and at least one corresponding ground truth traffic property used as plurality of labels to generate a trained model, wherein the ground truth may be obtained from a secondary acquisition means; and
  prediction means for predicting at least one traffic property for a processed waterfall data within a predetermined time range and within a predetermined position range based on the trained model.

A method according to the present disclosure comprising:
  acquiring waterfall data comprising a generation position of a vibration, a generation time of the vibration and an amplitude of the vibration generated by a vehicle traveling on a road;
  transforming the acquired waterfall data;
  training a portion of the plurality of processed waterfall data and at least one corresponding ground truth traffic property used as plurality of labels to generate a trained model, wherein the ground truth may be obtained from a secondary acquisition means; and
  predicting at least one traffic property for a processed waterfall data within a predetermined time range and within a predetermined position range based on the trained model.

A non-transitory computer readable medium according to the present disclosure, the non-transitory computer readable medium storing a program that causes a computer to execute:
  acquiring waterfall data comprising a generation position of a vibration, a generation time of the vibration and an amplitude of the vibration generated by a vehicle traveling on a road;
  transforming the acquired waterfall data;
  training a portion of the plurality of processed waterfall data and at least one corresponding ground truth traffic property used as plurality of labels to generate a trained model, wherein the ground truth may be obtained from a secondary acquisition means; and
  predicting at least one traffic property for a processed waterfall data within a predetermined time range and within a predetermined position range based on the trained model.

According to the present disclosure, it is possible to provide a traffic prediction apparatus, system, method and program capable of predicting the number of vehicles and the speed of vehicles in a predetermined time and in a predetermined range based on waterfall data of vehicles.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

References will now be made in detail to the preferred embodiments of the invention, examples of which are illustrated in accompanying drawings. Where possible, the same reference numbers will be used throughout the drawings to refer to the same or like parts.

Embodiment 1

The configuration of the traffic prediction apparatus according to the first embodiment will be described.

Figure 1:
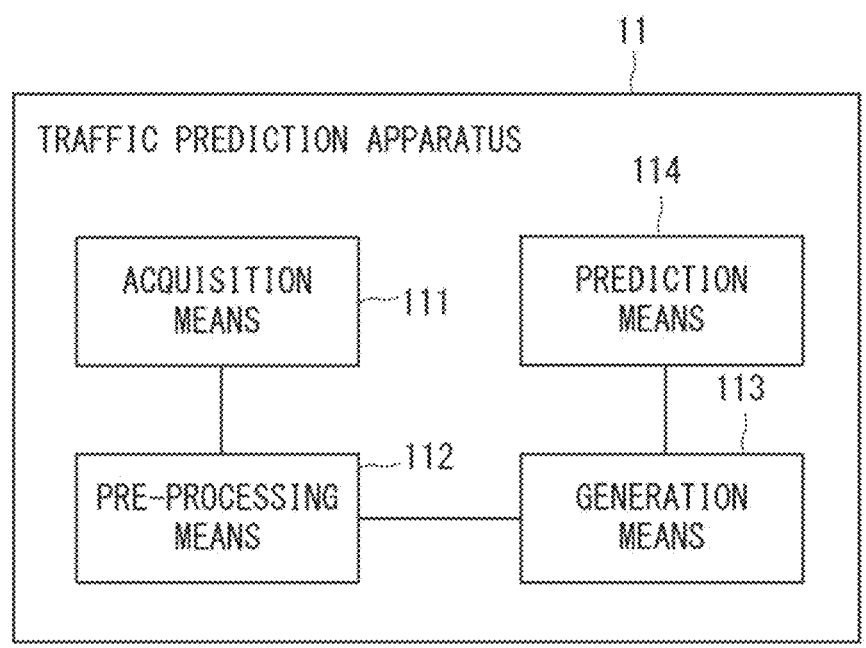
FIG. 1 is a block diagram illustrating a traffic prediction apparatus according to a first embodiment.

FIG. 1 is a block diagram illustrating a traffic prediction apparatus according to the first embodiment.

As shown in FIG. 1, the traffic prediction apparatus 11 according to the first embodiment includes an acquisition means 111, a pre-processing means 112, a generation means 113, and a prediction means 114.

The acquisition means 111 acquires waterfall data comprising a generation position of the vibration, a generation time of the vibration and an amplitude of the vibration generated by a vehicle traveling on a road. The acquisition means 111 acquires the waterfall data in which the vibration is a predetermined vibration or more.

The pre-processing means 112 transforms the acquired waterfall data.

The generation means 113 trains a portion of the plurality of processed waterfall data and at least one corresponding ground truth traffic property used as plurality of labels to generate a trained model. The ground truth may be obtained from a secondary acquisition means. The secondary acquisition means comprises of a camera based and/or an induction coil based object tracking means. The secondary acquisition means does not described in the FIG. 1.

The prediction means predicts at least one traffic property for a processed waterfall data within a predetermined time range and within a predetermined position range based on the trained model.

The configuration of the system according to the first embodiment will be described.

Figure 2:
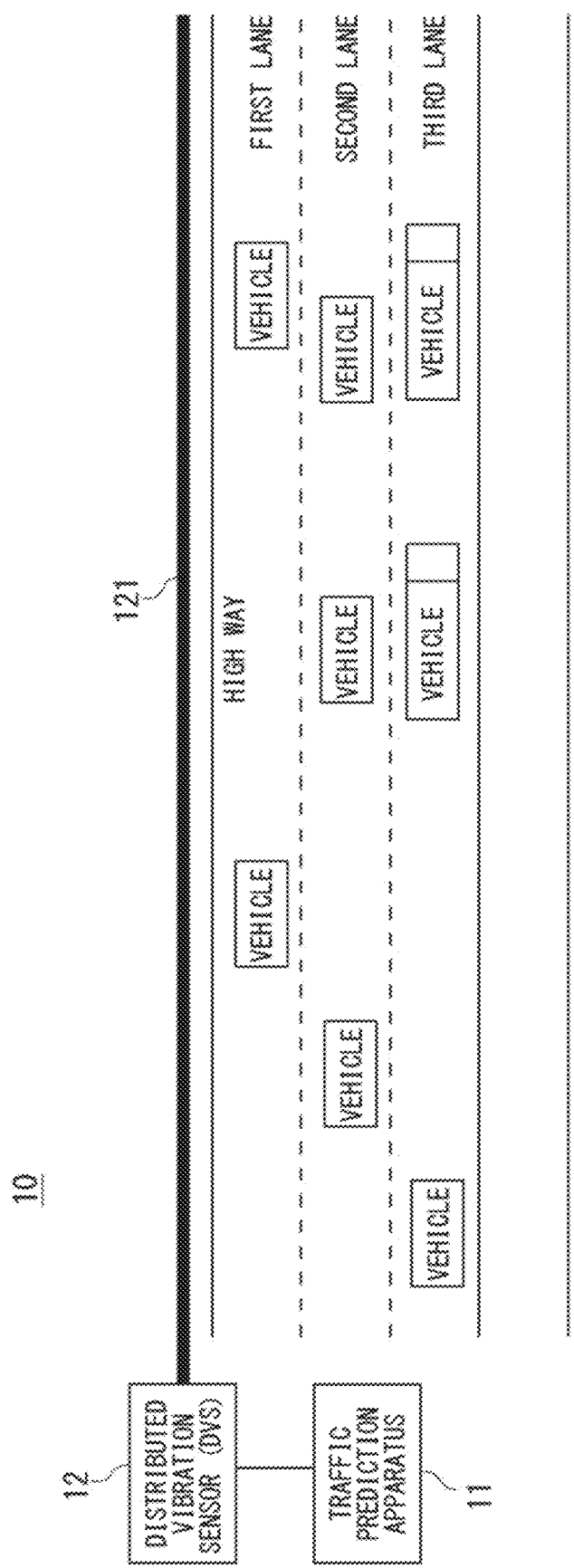
FIG. 2 is a block diagram illustrating a system according to a first embodiment.

FIG. 2 is a block diagram illustrating the system according to the first embodiment.

As shown in FIG. 2, the system 10 according to the first embodiment includes the distributed vibration sensor 12 and the traffic prediction apparatus 11.

The distributed vibration sensor 12 includes an optical fiber 121 and a plurality of sensing portions (not shown).

The optical fiber 121 is provided along the road (highway). The plurality of sensing portions are provided on the optical fiber 121 for detecting vibrations. The plurality of sensing portions detect vibrations of the vehicle traveling on a freeway. That is, the waterfall data of the vehicle are detected by the plurality of the sensing portions.

Figure 3:
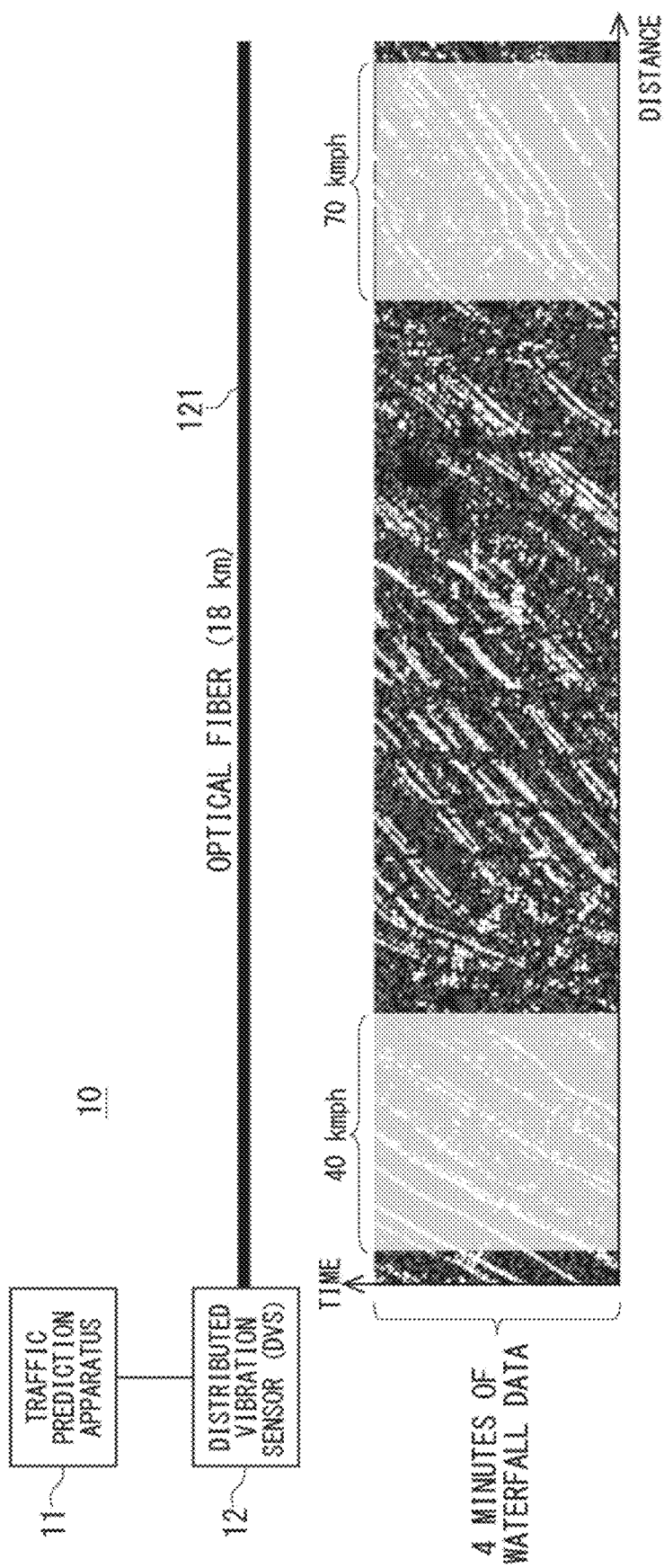
FIG. 3 is a graph which illustrates waterfall data from many vehicles travelling at different speeds at different time instants.

FIG. 3 is a graph illustrating waterfall data from many vehicles travelling at different speeds at different time instants.

The horizontal axis shown in FIG. 3 indicates the distance and the vertical axis indicates the time. The distance is, for example, a distance from the distributed vibration sensor 12 along the optical fiber 121.

FIG. 3 is a graph which shows a plurality of vibration points at multiple points and multiple times on the optical fiber.

Figure 4:
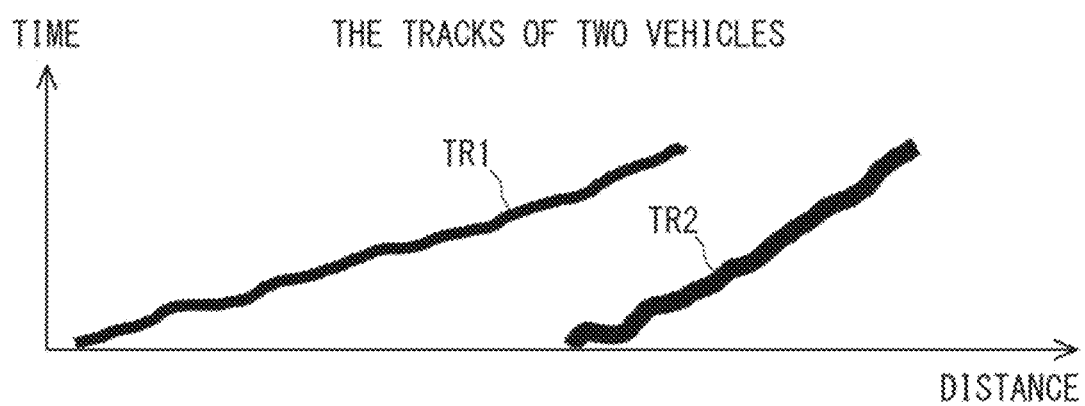
FIG. 4 is a graph which illustrates a part of waterfall data of two vehicles.

FIG. 4 is a graph which illustrates a part of waterfall data of two vehicles.

The horizontal axis shown in FIG. 4 indicates the distance and the vertical axis indicates the time.

FIG. 4 shows a part of the tracks of two vehicles.

As shown in FIG. 3, there is a plurality of tracks in FIG. 3. Each track corresponds to a traveled track of a vehicle such as a car, a bus, or a truck. Slope of each track indicates that vehicle's speed. Number of tracks indicates the number of vehicles. So traffic/vehicle speed and number of vehicles are gotten based on the plurality of tracks shown in FIG. 3. The slope of tracks at start of optical fiber 121 is more than the tracks at the end of optical fiber 121. Therefore the speed at start point of the optical fiber 121 is less than the speed at end point of the optical fiber 121.

Also, as shown in FIG. 4, when the traffic flow of the vehicle is small, the vehicle track TR1 and the vehicle track TR2 do not overlap, and there is a lot of space between the vehicle track TR1 and the vehicle track TR2. Thus, the vehicle tracks can be easily separated and identified.

The pre-processing means 112 can be used to normalize the vibration amplitude of the waterfall data at each generation position combined across a predetermined time range. This can help to solve two issues. The first issue is related to varying sensitivity of the generation positions. Such varying sensitivity can arise from the uneven road surface or the uneven optical fiber cable installation etc. The second issue is related to varying volumes of traffic. A large number of vehicles can generate large vibrations in a predetermined time range and can suppress the significance of vehicle vibrations from a different time range having fewer vehicles.

The pre-processing means 112 can also be used to limits the maximum vibration amplitude at each generation position and each generation time to a predetermined value. This can help to limit the large vibrations coming from a large vehicle like a truck, which might make the neighboring vehicle vibrations less significant.

When the traffic flow of the vehicle is large, it is difficult to separate and identify each vehicle tracks.

Therefore, in order to train a model, the traffic prediction apparatus 11 according to the first embodiment uses measured waterfall data, measured conditions, and ground truth labels of at least one traffic flow property. Then, the traffic prediction apparatus 11 predicts/estimates traffic flow properties using the trained model and the new/unseen waterfall data and its measured conditions.

The operation of the traffic prediction apparatus according to the first embodiment will be described.

Figure 5:
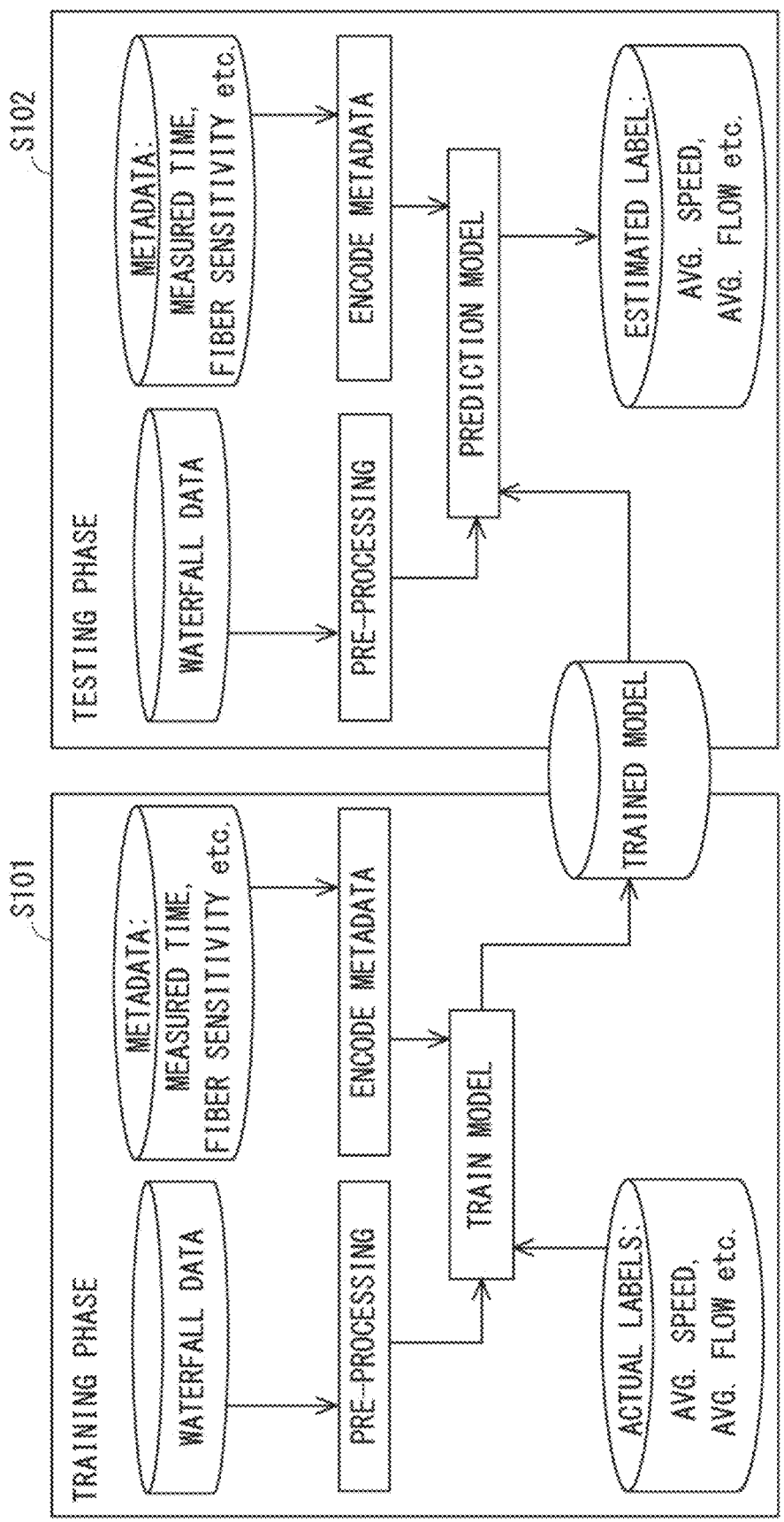
FIG. 5 is a block diagram illustrating the operation of the traffic prediction apparatus according to the first embodiment.

FIG. 5 is a block diagram illustrating the operation of the traffic prediction apparatus according to the first embodiment.

As shown in FIG. 5, Traffic prediction apparatus 11 comprises a training phase S101 and a testing phase S102. The training phase S101 includes pre-processing the acquired waterfall data of the vehicle and encoding the acquired measurement condition. The measurement condition is data indicating conditions to be measured, such as measurement time and sensitivity of the distributed vibration sensor. The measurement conditions include at least one of weather conditions and time. The measurement conditions may be referred to as metadata.

The training phase S101 includes training a model using pre-processed waterfall data, encoded conditions, and ground truth labels of traffic properties. The training phase S101 generates a trained model capable of mapping the waterfall data to its corresponding ground truth traffic property. The training phase S101 trains the plurality of the waterfall data acquired under predetermined measurement conditions. A few examples of models good for training such waterfall data are, however not limited to, support vector machines (SVM), deep neural networks (DNN) like convolutional (CNN) and recurrent (RNN) networks. The trained model obtained by S101 includes the trained model parameters.

The testing phase S102 operates a prediction model using the trained model, new waterfall data, and its measurement conditions. The testing phase S102 predicts/estimates traffic properties based on the prediction model. The traffic properties are, for example, the number of vehicles or the speed of each vehicle within a predetermined time and within a predetermined range. The prediction model is operated/initialized using the trained model parameters obtained from S101.

The traffic prediction apparatus 11 according to the first embodiment generates a plurality of trained models from the waterfall data of the vehicle. The traffic prediction apparatus 11 predicts the number of vehicles and the speed of the vehicles using the generated trained model. As a result, the present disclosure provides a traffic prediction apparatus, system, method and program capable of predicting the number of vehicles and the speed of vehicles in a predetermined time and in a predetermined range based on waterfall data of vehicles.

The traffic prediction apparatus 11 can predict traffic information such as traffic flow of vehicles, average number of vehicles, average speed, and occupancy rate of road lanes from the number of vehicles in a predetermined time and a predetermined range and the speed of the vehicles. That is, the at least one predicted traffic property is average traffic speed or number of vehicles or speed of each vehicle.

Embodiment 2

The traffic prediction apparatus 21 according to the second embodiment differs from the traffic prediction apparatus 11 according to the first embodiment in that the waterfall data is processed so as to be easily analyzed for various vehicle speeds.

Figure 6:
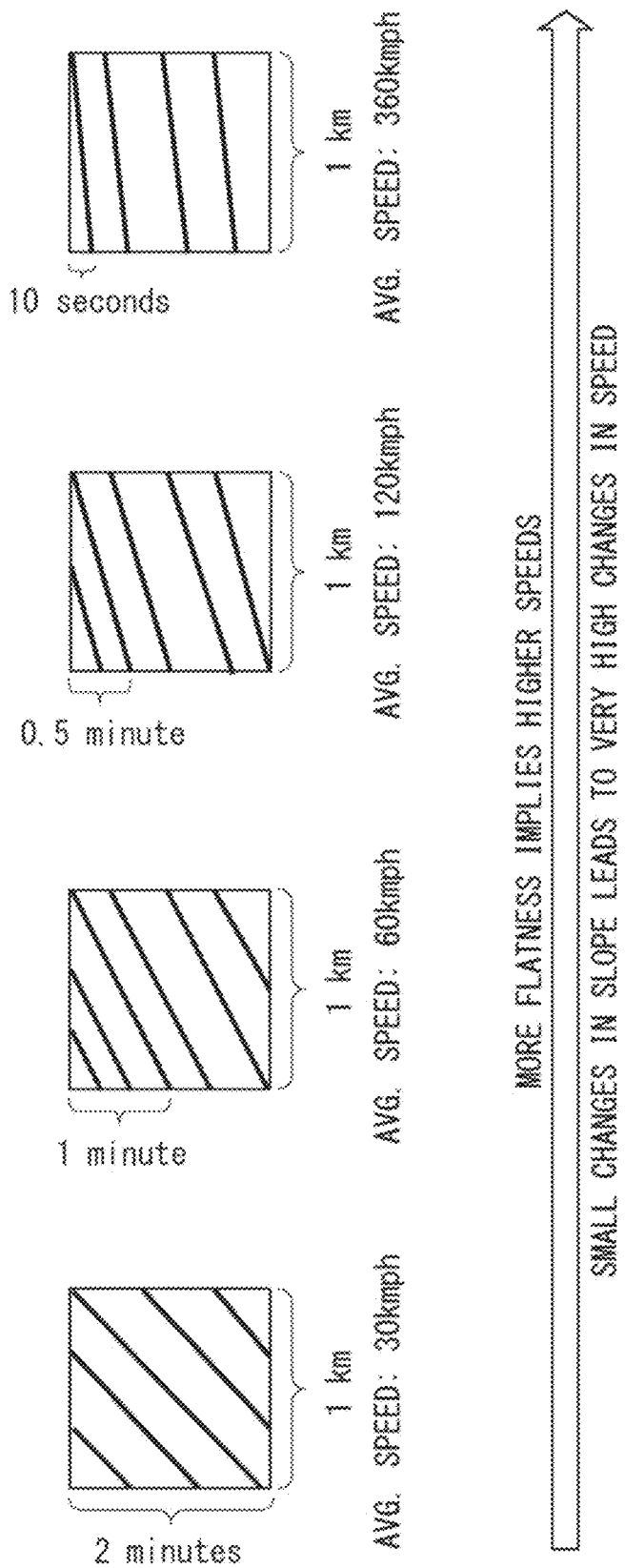
FIG. 6 is a graph which illustrates a part of waterfall data of many vehicles.

FIG. 6 is a graph illustrating a part of waterfall data of many vehicles.

Figure 7:
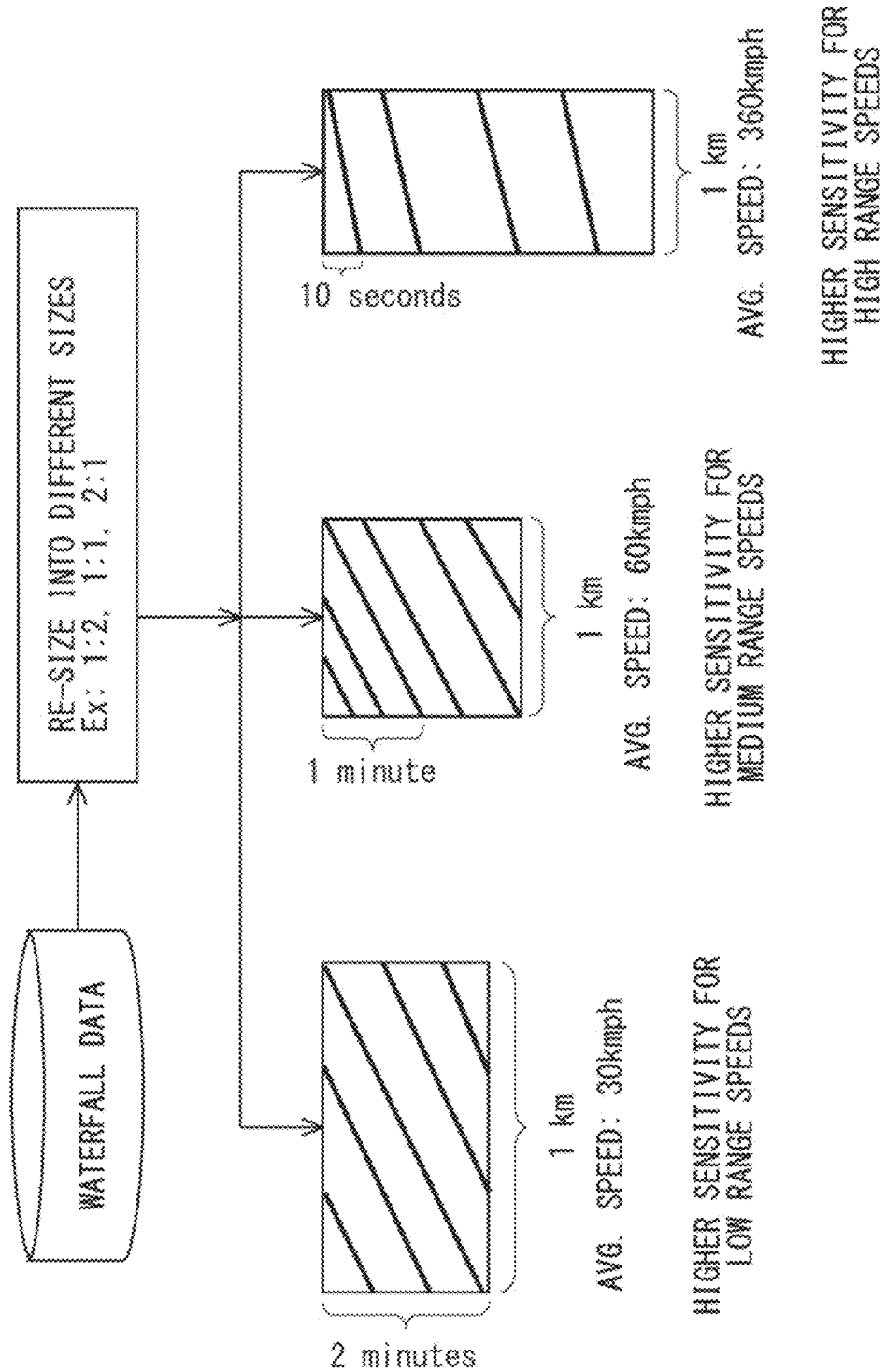
FIG. 7 is a block diagram illustrating a part of the operation of the traffic prediction apparatus according to the second embodiment.

FIG. 7 is a block diagram illustrating a part of the operation of the traffic prediction apparatus according to the second embodiment.

Figure 8:
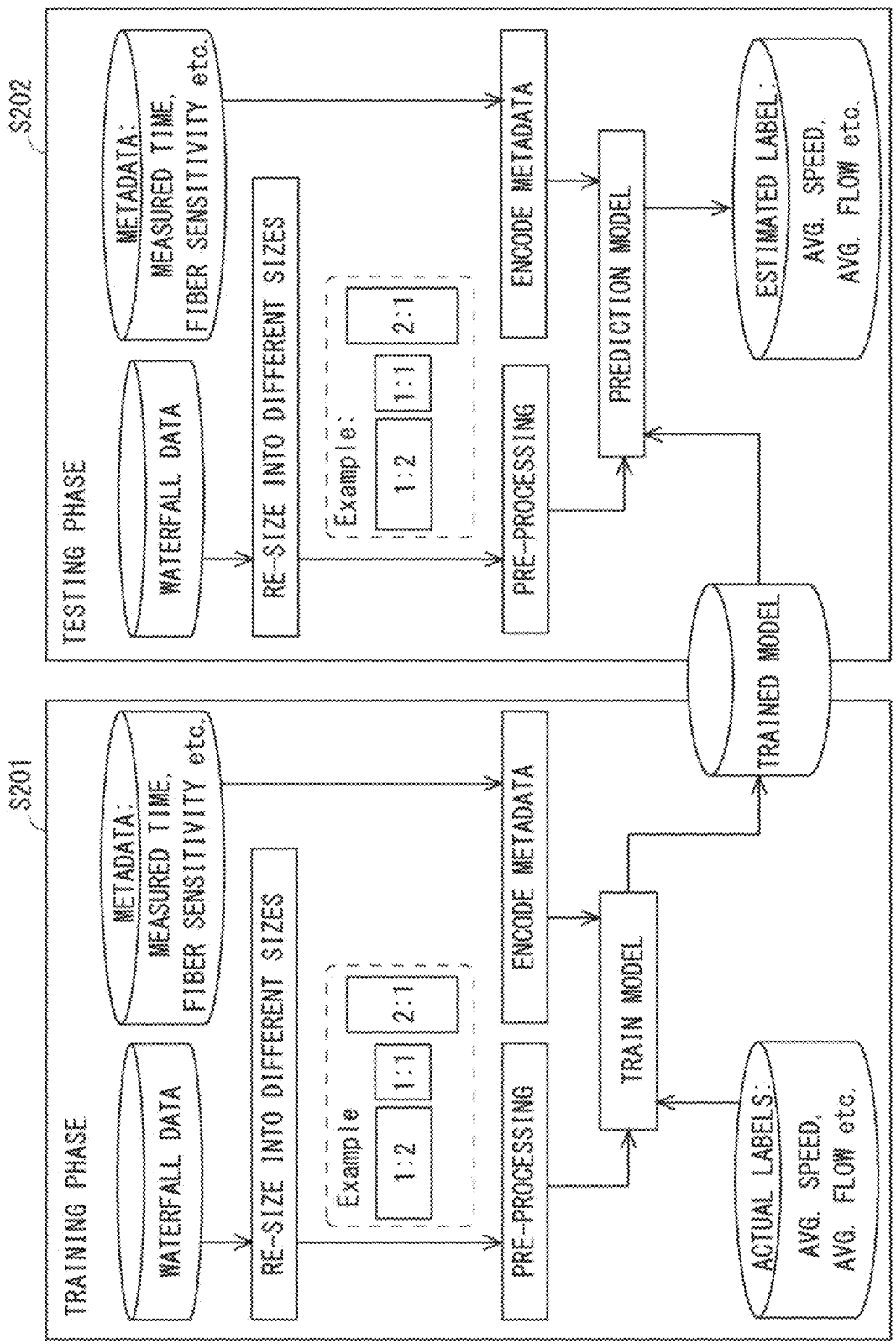
FIG. 8 is a block diagram illustrating the operation of the traffic prediction apparatus according to the second embodiment.

FIG. 8 is a block diagram illustrating the operation of the traffic prediction apparatus according to the second embodiment.

As shown in FIG. 6, the slope when the average speed of the vehicle is 60 kmph is lower than the slope when the average speed of the vehicle is 30 kmph. The slope when the average speed of the vehicle is 120 kmph is lower than the slope when the average speed of the vehicle is 60 kmph. More flatness of the slope implies higher speeds. When the vehicle speeds (traffic speeds) are high (equal 80 kmph or more), the vehicle tracks becomes more flatter. This decreases the sensitivity to estimate high speeds. Small changes in the slope lead to very high changes in speed. The higher the speed of the vehicle, the more difficult it is to accurately estimate their speed.

Therefore, as shown in FIG. 7, the traffic prediction apparatus 21 re-sizes the waterfall data into data of a plurality of different aspect ratios (sizes). Each aspect ratio emphasizes different ranges of speed. Then, the traffic prediction apparatus 21 trains the train model using the resized data.

The traffic prediction apparatus 21 generates a graph whose horizontal axis indicates a distance from a predetermined point to the generation position and whose vertical axis indicates the generation time based on the waterfall data. The traffic prediction apparatus 21 controls a ratio between the vertical axis and the horizontal axis of the graph.

The traffic prediction apparatus 21 generates a plurality of graphs based on a set of ratios between the vertical axis and the horizontal axis of the graph.

As shown in FIG. 8, the traffic prediction apparatus 21 re-sizes the waterfall data into a plurality of different sizes. Thereby, waterfall data can be easily analyzed for various vehicle speeds and effectively find traffic congestions and over-speeding.

Embodiment 3

Figure 9:
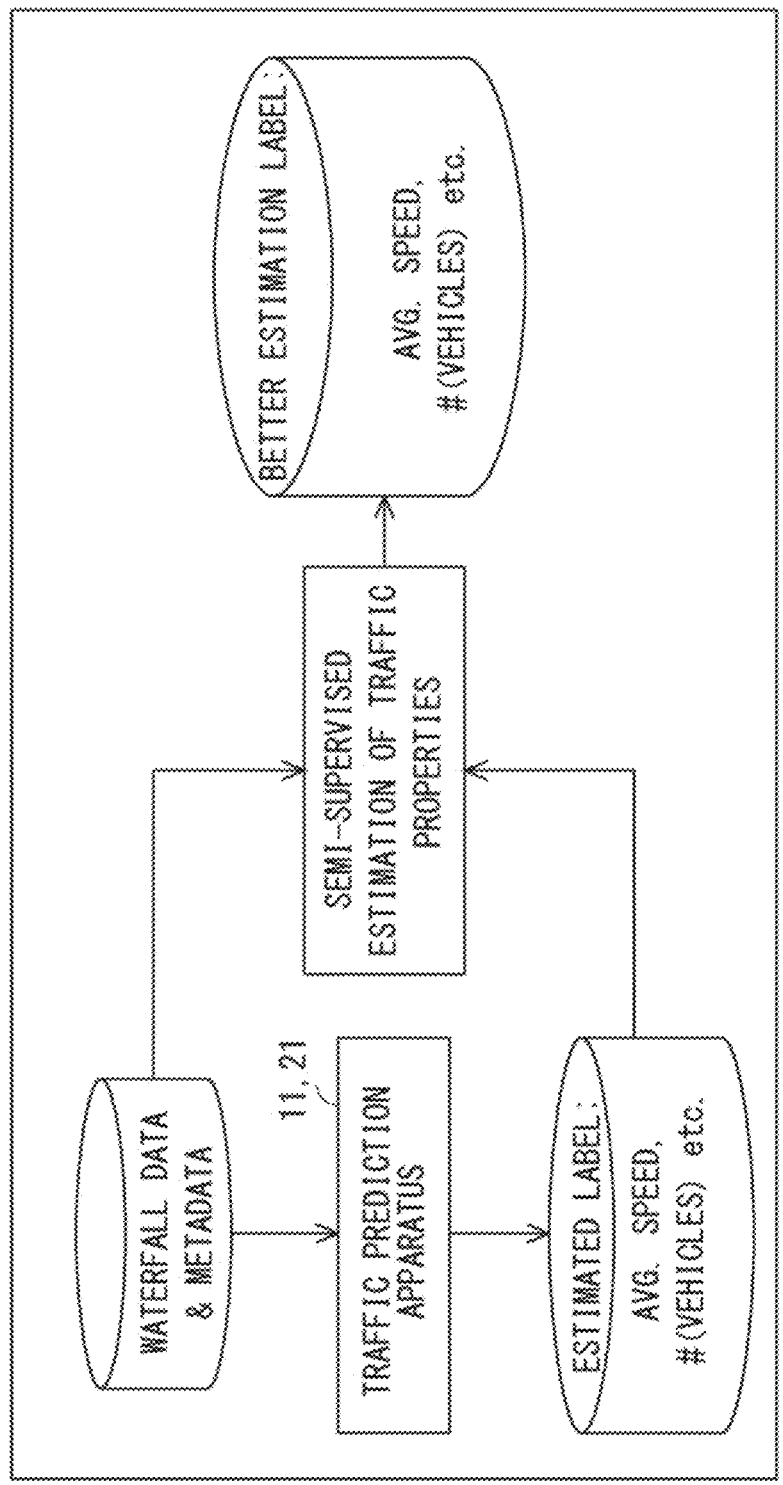
FIG. 9 is a block diagram illustrating the operation of the traffic prediction apparatus according to the third embodiment.

FIG. 9 is a block diagram illustrating the operation of the traffic prediction apparatus according to the third embodiment.

As shown in FIG. 9, the traffic prediction apparatus 31 according to the third embodiment uses, as an initial value, traffic properties like the number of vehicles and the average speed which are output results of the traffic prediction apparatus 11 or the traffic prediction apparatus 21. That is, the traffic prediction apparatus 31 performs more robust prediction using the estimation value of the traffic prediction apparatus 11 or the traffic prediction apparatus 21.

Specifically, the traffic prediction apparatus 31 selects a predetermined trained model from among the plurality of the trained models. The traffic prediction apparatus 31 predicts the number of vehicles and the speed of the each vehicle based on the selected predetermined trained model.

The traffic prediction apparatus 31 may select one of the plurality of trained models that is close to the speed of the vehicle as the predetermined trained model. The traffic prediction apparatus 31 may select, for example, one within a predetermined speed range among the plurality of trained models as a predetermined trained model.

As a result, the traffic prediction apparatus 31 finely adjusts traffic properties like the number of vehicles and the average speed, so that they can be predicted (estimated) better than the traffic prediction apparatus 11 or the traffic prediction apparatus 21. Moreover, the prediction time of the number of vehicles and the speed for each vehicle can be shortened.

Embodiment 4

Figure 10:
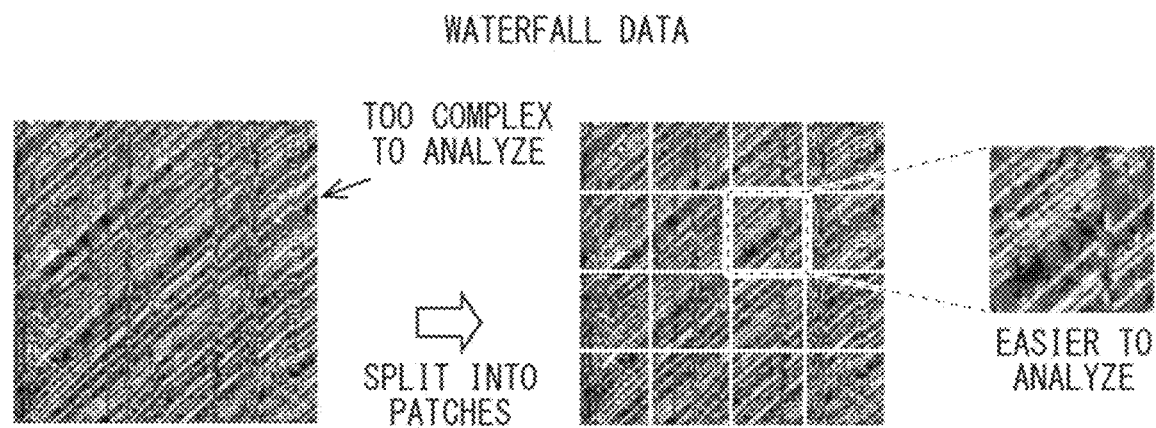
FIG. 10 is a graph which illustrates a part of waterfall data of many vehicles.

FIG. 10 is a graph illustrating a part of waterfall data of many vehicles.

Figure 11:
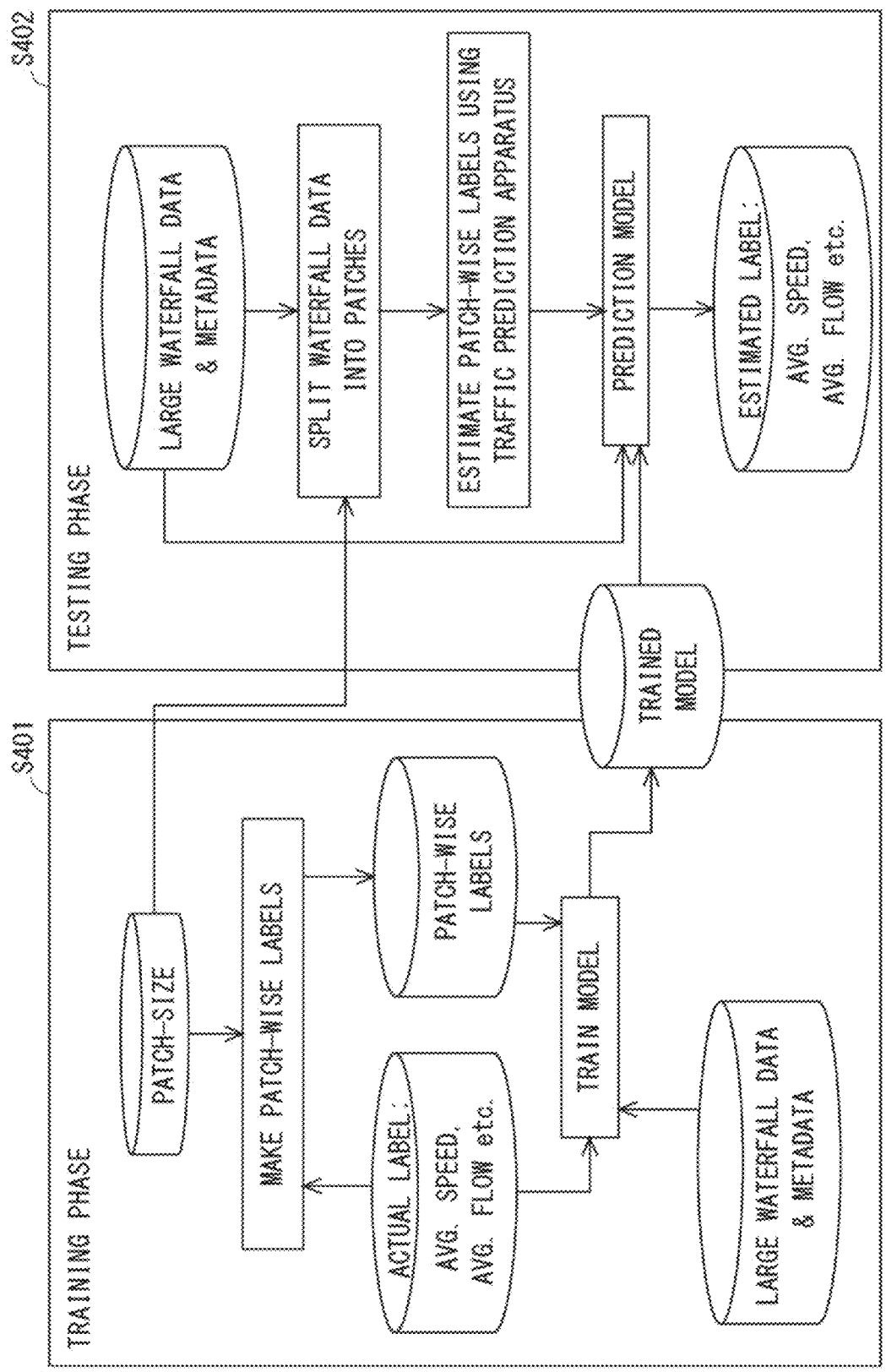
FIG. 11 is a block diagram illustrating the operation of the traffic prediction apparatus according to the fourth embodiment.

FIG. 11 is a block diagram illustrating the operation of the traffic prediction apparatus according to the fourth embodiment.

As shown in FIG. 10, if this waterfall data spans large sections of the road and/or large time periods, then the estimated traffic properties becomes less accurate because of large number of vehicle tracks. That is, analysis may be difficult because there are many waterfall data and it is too complex.

In this case, the traffic prediction apparatus 41 splits the waterfall data into a plurality of small patches. The traffic prediction apparatus 41 facilitates analysis by dividing it into the plurality of patches.

The traffic prediction apparatus 41 splits the waterfall data into small patches, estimates traffic properties in each patch and then integrate the estimated traffic properties for accurate overall estimation.

That is, the traffic prediction apparatus 41 transforms the data for each of the patches instead of the waterfall data. The traffic prediction apparatus 41 trains a portion of the plurality of processed waterfall data and at least one corresponding ground truth traffic property for the waterfall data as well as each of the plurality of patches to generate a trained model. The traffic prediction apparatus 41 predicts traffic properties for each of the patches. The traffic prediction apparatus 41 uses the plurality of predicted traffic properties and the trained model to predict the overall traffic properties of the waterfall data.

The size of the patch is a size capable of separating (classifying) the waterfall data. The size of the patch can be optimized during training phase using methods like k-fold cross validation.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

Although the present disclosure has been described as the hardware configuration in the above embodiment, the present disclosure is not limited to this. The present disclosure can also realize the processing of each component by causing a central processing unit (CPU) to execute a computer program.

The program can be stored and provided to the computer device using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to the computer device using any type of transitory computer readable media. Examples of transitory computer readable media include electric signals, optical signals, and electromagnetic waves. Transitory computer readable media can provide the program to the computer device via a wired communication line, such as electric wires and optical fibers, or a wireless communication line.

As mentioned above, although this disclosure was demonstrated with reference to embodiment, this disclosure is not limited by the above. The configuration and details of the present disclosure can be modified in various ways that can be understood by those skilled in the art within the scope of the disclosure.

Note that the present disclosure is not limited to the above embodiment, and can be appropriately modified without departing from the scope of the present disclosure.

For example, the whole or part of the exemplary embodiments disclosed above can be described as, but not limited to, the following supplementary notes.

(Supplementary Note 1)

A traffic prediction apparatus comprising:

acquisition means for acquiring waterfall data comprising a generation position of a vibration, a generation time of the vibration and an amplitude of the vibration generated by a vehicle traveling on a road;

pre-processing means for transforming the acquired waterfall data;

generation means for training a portion of the plurality of processed waterfall data and at least one corresponding ground truth traffic property used as plurality of labels to generate a trained model, wherein the ground truth may be obtained from a secondary acquisition means; and prediction means for predicting at least one traffic property for a processed waterfall data within a predetermined time range and within a predetermined position range based on the trained model.

(Supplementary Note 2)

The traffic prediction apparatus according to Supplementary note 1, wherein the pre-processing means normalizes the vibration amplitude of the waterfall data at each generation position combined across a predetermined time range.

(Supplementary Note 3)

The traffic prediction apparatus according to Supplementary note 1 or 2, wherein the pre-processing means limits the maximum vibration amplitude at each generation position and each generation time to a predetermined value.

(Supplementary Note 4)

The traffic prediction apparatus according to any one of Supplementary notes 1 to 3, wherein the pre-processing means generates a graph whose horizontal axis indicates a distance from a predetermined point to the generation position and whose vertical axis indicates the generation time based on the waterfall data;

the pre-processing means controls a ratio between the vertical axis and the horizontal axis of the graph.

(Supplementary Note 5)

The traffic prediction apparatus according to Supplementary note 4, wherein the pre-processing means generates a plurality of graphs based on a set of ratios between the vertical axis and the horizontal axis of the graph.

(Supplementary Note 6)

The traffic prediction apparatus according to any one of Supplementary notes 1 to 5, wherein the secondary acquisition means comprises of a camera based and/or an induction coil based object tracking means.

(Supplementary Note 7)

The traffic prediction apparatus according to any one of Supplementary notes 1 to 6, wherein the waterfall data is divided into a plurality of patches;

the pre-processing means transforms the data for each of the patches instead of the waterfall data;

the generation means trains a portion of the plurality of processed waterfall data and at least one corresponding ground truth traffic property for the waterfall data as well as each of the plurality of patches to generate a trained model; and the prediction means predicts traffic properties for each of the patches and uses the plurality of predicted traffic properties and the trained model to predict the overall traffic properties of the waterfall data.

(Supplementary Note 8)

The traffic prediction apparatus according to Supplementary note 7, wherein the size of the patch is a size capable of classifying the waterfall data.

(Supplementary Note 9)

The traffic prediction apparatus according to any one of Supplementary notes 1 to 8, wherein the generation means trains the plurality of the waterfall data acquired under predetermined conditions.

(Supplementary Note 10)

The traffic prediction apparatus according to Supplementary note 9, wherein the predetermined conditions include at least one of weather conditions and time.

(Supplementary Note 11)

The traffic prediction apparatus according to any one of Supplementary notes 1 to 10, wherein the acquisition means acquires the waterfall data in which the vibration is a predetermined vibration or more.

(Supplementary Note 12)

The traffic prediction apparatus according to any one of Supplementary notes 1 to 11, wherein the at least one predicted traffic property is average traffic speed or number of vehicles or speed of each vehicle.

(Supplementary Note 13)

a distributed vibration sensor and a traffic prediction apparatus; wherein the distributed vibration sensor includes;

an optical fiber provided along a road, and a plurality of sensing portions on the optical fiber for detecting vibrations, the traffic prediction apparatus includes;

acquisition means for acquiring waterfall data comprising a generation position of a vibration, a generation time of the vibration and an amplitude of the vibration generated by a vehicle traveling on a road;

pre-processing means for transforming the acquired waterfall data;

generation means for training a portion of the plurality of processed waterfall data and at least one corresponding ground truth traffic property used as plurality of labels to generate a trained model, wherein the ground truth may be obtained from a secondary acquisition means; and prediction means for predicting at least one traffic property for a processed waterfall data within a predetermined time range and within a predetermined position range based on the trained model.

(Supplementary Note 14)

A Method Comprising:

acquiring waterfall data comprising a generation position of a vibration, a generation time of the vibration and an amplitude of the vibration generated by a vehicle traveling on a road;

transforming the acquired waterfall data;

training a portion of the plurality of processed waterfall data and at least one corresponding ground truth traffic property used as plurality of labels to generate a trained model, wherein the ground truth may be obtained from a secondary acquisition means; and predicting at least one traffic property for a processed waterfall data within a predetermined time range and within a predetermined position range based on the trained model.

(Supplementary Note 15)

A non-transitory computer readable medium storing a program that causes a computer to execute:

acquiring waterfall data comprising a generation position of a vibration, a generation time of the vibration and an amplitude of the vibration generated by a vehicle traveling on a road;

transforming the acquired waterfall data;

training a portion of the plurality of processed waterfall data and at least one corresponding ground truth traffic property used as plurality of labels to generate a trained model, wherein the ground truth may be obtained from a secondary acquisition means; and predicting at least one traffic property for a processed waterfall data within a predetermined time range and within a predetermined position range based on the trained model.

REFERENCE SIGNS LIST 10 system
11, 21, 31, 41 traffic prediction apparatus
111 acquisition means
112 pre-processing means
113 generation means
114 prediction means
12 distributed vibration sensor
121 optical fiber
TR1, TR2 vehicle track

What is claimed is:

1. A traffic prediction apparatus comprising:
at least one memory storing instructions, and
at least one processor configured to execute the instructions to:
acquire a plurality of pieces of waterfall data that each comprise a generation position of a vibration generated by a vehicle traveling on a road, a generation time of the vibration, and an amplitude of the vibration;
process each piece of waterfall data by transforming the each piece of waterfall data;
obtain a ground truth for each piece of waterfall data using a secondary acquisition mechanism;
generate a trained model by training a model using as training data a portion of the processed pieces of waterfall data and the ground truth, the ground truth used as labels for the portion of the processed pieces of water fall data;
predict a traffic property for each piece of processed waterfall data within a predetermined time range and within a predetermined position range, based on the trained model;
generate a graph of the pieces of waterfall data having a horizontal axis indicating distance from a predetermined point to the generation position of each piece of waterfall data and having a vertical axis indicating the generation time of each piece of waterfall data; and
control a ratio between the vertical axis and the horizontal axis of the graph.

2. The traffic prediction apparatus according to claim 1, wherein
the at least one processor normalizes a vibration amplitude of each piece of waterfall data across a predetermined time range.

3. The traffic prediction apparatus according to claim 1, wherein
the at least one processor limits a maximum vibration amplitude of each piece of waterfall data to a predetermined value.

4. The traffic prediction apparatus according to claim 1, wherein
the at least one processor generates a plurality of graphs having different ratios between the vertical axis and the horizontal axis.

5. The traffic prediction apparatus according to claim 1, wherein
the ground truth is obtained by a camera and/or an induction coil as the secondary acquisition mechanism.

6. The traffic prediction apparatus according to claim 1, wherein
the plurality of pieces of waterfall data is divided into a plurality of patches;
the at least one processor processes each patch of by transforming the each patch, instead of processing each piece of waterfall data by transforming the each piece of waterfall data;
the at least one processor generates the trained model by training the model using as the training data the patches in addition to the portion of the processed pieces of waterfall data and the ground truth; and
the at least one processor predicts the traffic property for each patch, and uses the predicted traffic property and the trained model to predict an overall traffic property of the plurality of pieces of waterfall data.

7. The traffic prediction apparatus according to claim 6, wherein
the size of each patch is a size capable of classifying the waterfall data.

8. The traffic prediction apparatus according to claim 1, wherein
the at least one processor trains the model where the plurality of pieces of waterfall have been data acquired under predetermined conditions.

9. The traffic prediction apparatus according to claim 8, wherein
the predetermined conditions include at least one of weather conditions and time.

10. The traffic prediction apparatus according to claim 1, wherein
the at least one processor acquires the plurality of pieces of waterfall data in which the vibration is a predetermined vibration or more.

11. The traffic prediction apparatus according to claim 1, wherein
the predicted traffic property is average traffic speed, a number of vehicles, or a speed of each vehicle.

12. A system comprising:
a distributed vibration sensor and a traffic prediction apparatus, wherein
the distributed vibration sensor includes:
an optical fiber provided along a road; and
a plurality of sensing portions on the optical fiber for detecting vibrations,
the traffic prediction apparatus includes:
at least one memory storing instructions; and
at least one processor configured to execute the instructions to:
acquire a plurality of pieces of waterfall data that each comprise a generation position of a vibration generated by a vehicle traveling on the road, a generation time of the vibration, and an amplitude of the vibration;
process each piece of waterfall data by transforming the each piece of waterfall data;
obtain a ground truth for each piece of waterfall data using a secondary acquisition mechanism;
generate a trained model by training a model using as training data a portion of the processed pieces of waterfall data and the ground truth, the ground truth used as labels for the portion of the processed pieces of water fall data;
predict a traffic property for each piece of processed waterfall data within a predetermined time range and within a predetermined position range, based on the trained model;
generate a graph of the pieces of waterfall data having a horizontal axis indicating distance from a predetermined point to the generation position of each piece of waterfall data and having a vertical axis indicating the generation time of each piece of waterfall data; and
control a ratio between the vertical axis and the horizontal axis of the graph.

13. A method performed by a computer and comprising:
acquiring a plurality of pieces of waterfall data that each comprise a generation position of a vibration generated by a vehicle traveling on a road, a generation time of the vibration, and an amplitude of the vibration;
processing each piece of waterfall data by transforming the each piece of waterfall data;
obtaining a ground truth for each piece of waterfall data using a secondary acquisition mechanism;
generating a trained model by training a model using as training data a portion of the processed pieces of waterfall data and the ground truth, the ground truth used as labels for the portion of the processed pieces of water fall data;
predicting a traffic property for each piece of processed waterfall data within a predetermined time range and within a predetermined position range, based on the trained model;
generating a graph of the pieces of waterfall data having a horizontal axis indicating distance from a predetermined point to the generation position of each piece of waterfall data and having a vertical axis indicating the generation time of each piece of waterfall data; and
controlling a ratio between the vertical axis and the horizontal axis of the graph.

* * * * *